United States Patent
Hoffman et al.

(10) Patent No.: US 12,266,175 B2
(45) Date of Patent: Apr. 1, 2025

(54) COMBINING VISUAL AND AUDIO INSIGHTS TO DETECT OPENING SCENES IN MULTIMEDIA FILES

(71) Applicant: MICROSOFT TECHNOLOGY LICENSING, LLC, Redmond, WA (US)

(72) Inventors: Yonit Hoffman, Herzliya (IL); Mordechai Kadosh, Raanana (IL); Zvi Figov, Modiin (IL); Eliyahu Strugo, Tel Aviv (IL); Mattan Serry, Herzliya (IL); Michael Ben-Haym, Modiin-Maccabim reut (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/090,843

(22) Filed: Dec. 29, 2022

(65) Prior Publication Data

US 2024/0221379 A1    Jul. 4, 2024

(51) Int. Cl.
| | |
|---|---|
| *H04N 5/932* | (2006.01) |
| *G06V 10/70* | (2022.01) |
| *G06V 20/40* | (2022.01) |
| *G06V 20/62* | (2022.01) |
| *G06V 30/244* | (2022.01) |
| *G10L 15/00* | (2013.01) |
| *G10L 15/26* | (2006.01) |
| *G10L 25/48* | (2013.01) |
| *G11B 27/10* | (2006.01) |

(52) U.S. Cl.
CPC ............ *G06V 20/41* (2022.01); *G06V 10/70* (2022.01); *G06V 20/46* (2022.01); *G06V 20/49* (2022.01); *G06V 20/62* (2022.01); *G06V 30/245* (2022.01); *G10L 15/005* (2013.01); *G10L 15/26* (2013.01); *G10L 25/48* (2013.01); *G11B 27/102* (2013.01)

(58) Field of Classification Search
USPC ........................................................ 386/241
See application file for complete search history.

(56) References Cited

U.S. PATENT DOCUMENTS

| | | | |
|---|---|---|---|
| 8,386,506 B2* | 2/2013 | Martinez ............... | H04L 67/306 707/759 |
| 2012/0233642 A1* | 9/2012 | Piatt ................. | H04N 21/47815 725/60 |
| 2015/0279344 A1* | 10/2015 | Nguyen .................... | G10K 5/00 446/204 |
| 2017/0025152 A1* | 1/2017 | Jaime .................... | H04N 21/854 |
| 2017/0193094 A1* | 7/2017 | Tong ................... | G06F 16/3331 |
| 2018/0152767 A1* | 5/2018 | Liu ..................... | H04N 21/4781 |
| 2021/0295148 A1* | 9/2021 | Gonsalves ............. | G06N 3/045 |
| 2023/0108579 A1* | 4/2023 | Cao .......................... | G06N 3/04 706/27 |

* cited by examiner

*Primary Examiner* — Nigar Chowdhury
(74) *Attorney, Agent, or Firm* — Workman Nydegger (57) ABSTRACT

Disclosed is a method for automatically detecting an introduction/opening song within a multimedia file. The method includes designating sequential blocks of time in the multimedia file as scene(s) and detecting certain feature(s) associated with each scene. The extracted scene feature(s) may be analyzed and used to assign a probability to each scene that the scene is part of the introduction/opening song. The probabilities may be used to classify each scene as either correlating to or not correlating to, the introduction/opening song. The temporal location of the opening song may be saved as index data associated with the multimedia file.

21 Claims, 7 Drawing Sheets

COMBINING VISUAL AND AUDIO INSIGHTS TO DETECT OPENING SCENES IN MULTIMEDIA FILES

BACKGROUND

Multimedia files—for example, series episodes and movies—often include an introduction with an opening song (hereinafter "opening song"). The characteristics of an opening song can vary, such as with regard to length, audio/visual (AV) content, and temporal location of the opening song within the video. By way of example, some opening songs will play concomitantly with the opening credits, while others do not. Likewise, some opening songs will play at the very beginning of the episode or movie, while others may play after one or two scenes of the episode or movie have already transpired.

The ability to detect the placement of an opening song in a media file can be important for facilitating playback functionality, as well as for post-production editing of the content. By way of example, the ability to automatically detect an opening song can facilitate a 'skip intro' capability—where a viewer can jump right to the main multimedia content and pass over the opening song. However, for such a capability, precision is required—one must be able to detect the exact beginning and end of the opening song. Otherwise, a portion of the main content may be incidentally skipped, rather than just the opening song.

The detection of an opening song can also facilitate selective processing of the media content (e.g., editing of the introduction in different languages).

Unfortunately, conventional systems for indexing the opening song and introduction of a media file, as well as for indexing the other portions of a media file, are limited to manual review and tagging of the different media segments. This process can be very cumbersome and expensive, as well as subjective and inconsistent.

In view of the foregoing, it will be appreciated that there is an ongoing need for improved systems and methods for detecting opening songs in different multimedia productions.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments are directed to systems and methods for classifying portions of multimedia content included in a media file. In particular, systems and methods are provided for facilitating the automatic detection of opening scene(s) (e.g., a predefined introduction or opening song) in multimedia content of a media file.

As described, the disclosed embodiments may include or be practiced on computing systems configured with modules for implementing the disclosed methods.

The disclosed methods include acts for designating sequential blocks of time in the multimedia content as scene(s), then detecting certain feature(s) of those scene(s). The extracted scene feature(s) may be analyzed by machine learning model(s), or other type of artificial intelligence (AI) model(s), to classify those scenes as either part of, or not part of, the introduction/opening song, based on a probability derived from the scene feature(s). The machine learning model(s) may be trained so as to give higher or lower weight to certain scene feature(s), based on the past success of those feature(s) to accurately predict whether a scene is part of the introduction/opening song.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosed systems and methods may be realized and obtained by means of the instruments and combinations particularly pointed out in the appended claims. Features of the present disclosed systems and methods will become more fully apparent from the following description and appended claims or may be learned by the practice of the disclosed systems and methods as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some of the disclosed embodiments are directed toward systems and methods for detecting a particular portion of multimedia files based on features extracted from the multimedia content of a multimedia file, as well as for tagging or otherwise indexing the detected portions of the multimedia files.

A multimedia file, or media file, comprises multimedia content with associated metadata about the multimedia content. Additionally, the multimedia content can be formatted in various different file formats. In some instances, the multimedia file comprises the raw multimedia content or a compressed or compiled version of the multimedia content. Multimedia content refers to electronic content which comprises multiple different media types, for example, audio content and visual content. Features can be extracted from the multimedia content wherein certain features correspond to each type of media represented in the multimedia content. It should be appreciated that the systems and methods disclosed, while described in application to multimedia content, may also be applied to media files comprising a single type of media.

Some of the disclosed embodiments are specifically directed to improved systems and methods for automatically detecting opening scene(s) (e.g., an opening song) that are included in the multimedia file. This can be beneficial, particularly when considering conventional systems, for enabling playback and post-production editing of the media files without requiring manual review and editing of each file being processed. For at least this reason, the disclosed embodiments may be implemented to provide many technical advantages over existing media processing systems, as will now be described in more detail.

Conventional media processing systems have largely employed manual tagging of the opening song in a multimedia file. Furthermore, these systems have typically analyzed the multimedia file according to the different frames that are included in the file. A frame refers to any temporal unit associated with the multimedia file. A frame is selected based on structural and semantic properties associated with the temporal unit. In some instances, a frame refers to a temporal unit comprising a still image associated with the multimedia file. In such instances, a plurality of frames is combined to form a moving picture. In some instances, a frame refers to a temporal unit comprising a limited portion of an audio file. In such instances, a plurality of frames is combined to form continuous audio. Thus, even a multimedia file comprising only a few minutes of multimedia content can contain thousands of frames. This results in a high computational cost, either manually, or using a computing system, to process the frames, identify which frames correspond to the opening song, and then tag the frames that have been identified.

Disclosed embodiments are directed to improved systems and methods for detection of an opening song to overcome the disadvantages of current detection solutions. For example, the system of the present disclosure differs from prior systems in that it allows for the automatic detection of the opening song and automatic tagging of the multimedia file, without the need for manual/human detection or tagging. This automation significantly reduces the time and cost it takes to process and edit a multimedia file with segment tagging. It can also improve the consistency in which segment boundaries are identified, at least as compared to subjective/arbitrary tagging that is sometimes caused by human error and variations in human perception.

The disclosed embodiments are able to achieve these aforementioned benefits of automatic detection by segmenting the multimedia file into scenes, as opposed to frames, as the building blocks for analyzing the multimedia file. Each segment of the multimedia file comprises a particular portion of multimedia content included in the multimedia file. The technical advantage of this is that there are far fewer scenes than frames in a multimedia file. This significantly reduces the computational expense of analyzing a limited number of scenes, instead of thousands of frames.

Herein, a scene refers to a particular portion of the multimedia content which is characterized by having continuous and distinct features from an adjacent portion of the multimedia content. In some instances, a scene is a multi-modality object which is extracted from electronic content. Scenes can be extracted based on visual and/or audio features. For example, a scene is typically associated with a particular set or environment in which the characters of the story are interacting. When one or more characters begin interacting in a different location of the story (e.g., set or geolocation), typically, a new scene has begun. In some instances, a scene involves the same set of characters or at least one or more same characters for some continuous length of time in the same environment. Because of the ability to detect a scene, features associated with a particular scene can be extracted and analyzed to determine which scenes are associated with the opening song.

Additional technical benefits include improved training of machine learning models used to automatically detect the opening song, resulting in improved machine learning models which are more accurate, consistent, and transparent. Because multiple different features are extractable from the different scenes of the multimedia file, the machine learning model can be trained on different sets of features which help it to detect opening songs of new multimedia files. Each scene corresponds to a particular subset of all features that are or can be extracted from the multimedia content included in multimedia file. Features can also be extracted from metadata included in the multimedia file which corresponds to the multimedia content. These features contribute to the model, both in training and during run-time.

Additionally, each feature can be assigned, either manually or by a machine learning model, a particular weight that predicts how much that feature will contribute to the prediction that the scene corresponds to the opening song. Some features may be more indicative or distinctive of an opening song than other features. For example, some features, like a series of written names appearing on the scene, may correlate to the opening song more than other features, like a background melody playing, which may appear more frequently throughout the entire multimedia content instead of exclusively in the opening scene.

Because of this weighting system, the results of the machine learning model are more transparent to users. For example, a user is able to understand why the machine learning model returned a particular result (e.g., why a particular scene or set of scenes was detected as the opening song portion) because the user is able to see which features were identified and how important each feature was (e.g., the weight applied to each feature) in predicting whether the scene(s) corresponded to the opening song.

The disclosed embodiments also achieve additional technical benefits over the prior art, in that the systems and methods described herein are flexible and scalable. In some instances, a user can tune how many features are to be extracted and processed. For example, if a user wants to improve the accuracy of the results, the user or the machine learning model can select a higher or total number of features available.

Alternatively, if a user wants to reduce the computational time of processing the file, the user or the machine learning model can select a lower or limited number of features available (e.g., the categories of features that have the highest weights). Additionally, if a new feature module is developed for identifying and extracting a new type of feature, the machine learning model is able to be trained on that new feature in isolation, or in combination with existing features, to update the model to be able to extract the new feature. The model can then use this new feature to augment and improve the detection of the opening song. The machine learning model is also configured to learn which feature, or combination of features, results in more accurate detection of the opening song for a particular type of media file. Accordingly, the machine learning model can add or omit certain features dynamically upon determining a particular type of media file.

It will be appreciated that the disclosed systems and methods can also be applied to detecting other portions of the multimedia content, such as closing credits, an intermission, or other distinct portions of the file content, etc. It should also be appreciated that the systems and methods can be used to analyze single media files, such as visual-only files, audio-only files, or other multimedia files including virtual reality and augment reality content files. Attention will first be directed to FIG. 1, which illustrates, in one embodiment, a multimedia file 100 which is separated into sequential scene(s) 120 (e.g., scene 1, scene 2, scene 3, scene 4, scene 5, scene 6, scene 7, scene 8, scene 9, scene 10, scene 11, scene 12, scene 13, scene 14, scene 15, scene 16, scene 17, and so forth). This may be done manually, or by an AI model, such as a machine learning model or other type of AI model.

Figure 1:
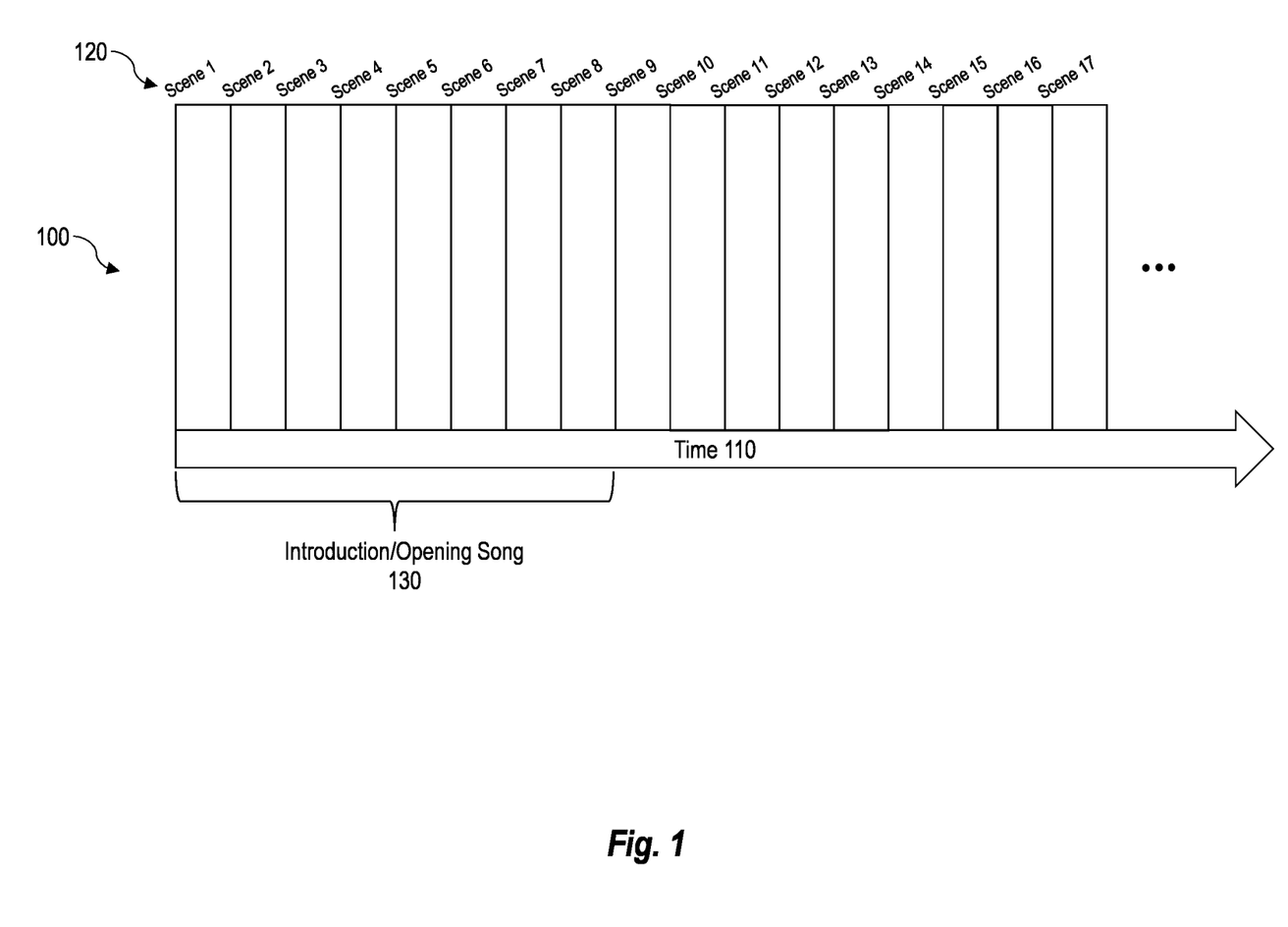
FIG. 1 illustrates an example of how multimedia content of a multimedia file can be broken up into sequential blocks of time designated as scenes, in order to detect the location of a predefined introduction/opening song.

For example, an AI model may recognize that the people/characters in a series of sequential shots in the multimedia file 100 do not change, or that the background scenery does not change. A shot is an inner unit of the scene, wherein a plurality of shots is identified in a media file. For example, a shot is a contiguous sequence of frames with the same or similar camera angle. A sequential subset of the plurality of shots is then aggregated into a scene. In some instances, multiple different subsets, where a subset comprises a certain number of shots, are aggregated into different scenes. For example, the model may classify a group of shots, frames, or blocks of sequential time 110 in the multimedia file, as individual scene(s) 120. As shown in FIG. 1, if the multimedia file 100 is viewed temporally (e.g., see Time 110), the file may be broken up into blocks of time 110 that are designated as sequential scene(s) 120. Scene(s) 120 may be determined by analyzing both audio and visual data from multimedia content of the multimedia file 100.

The disclosed systems also analyze each scene and extract one or more features for each scene and predict how likely each of the scenes corresponds to the opening song, wherein the system is able to detect which scene(s) correspond to the opening song. In this example, scenes 1-8 constitute the opening song 130. In some instances, all of the scenes in the file are analyzed. Alternatively, in some instances, once a set of scenes is predicted to correspond to an opening song, the system refrains from analyzing the rest of the scenes, which reduces the computational expense of processing the file.

Figure 2A:
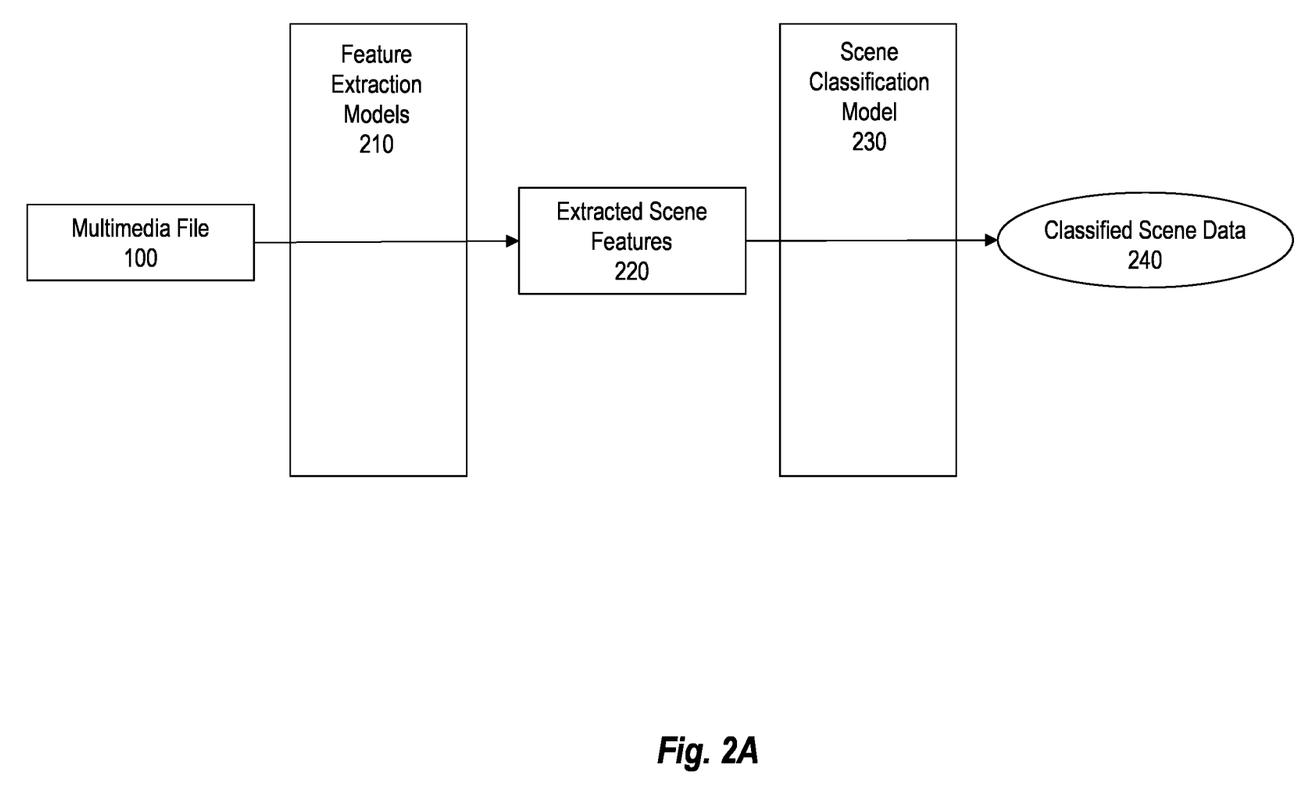
FIG. 2A illustrates an example flow chart for how scene(s) in a multimedia file can be analyzed for certain feature(s), and those feature(s) used to classify the scene(s) as either being part of, or not being part of, a predefined introduction/opening song.

Referring now to FIG. 2A, after the multimedia file 100 has been broken up into sequential scene(s) 120, each scene 120 may be characterized by certain feature(s) 220. As shown in FIG. 2A, the multimedia file 100—as a series of sequential scene(s) 120—is processed using a Feature Extraction Model 210 to determine whether a particular scene possesses certain feature(s) 220. Based on the feature (s) 220 associated with the particular scene, the particular scene is classified by a Scene Classification Model 230 to determine the probability 410 (shown in FIG. 4) that the scene is associated with the opening song 130. This process is repeated for some or all of the scenes in the multimedia file.

Figure 2B:
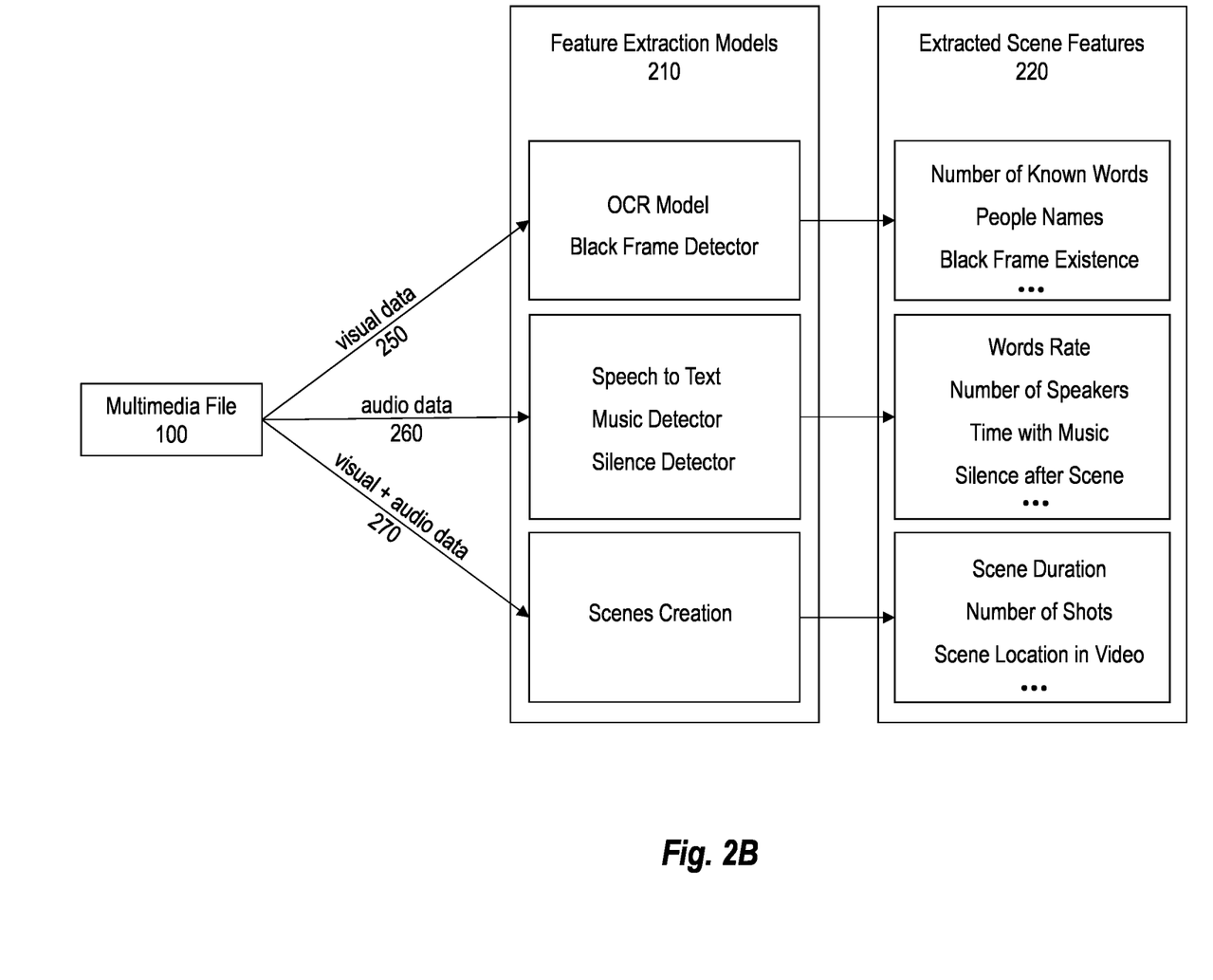
FIG. 2B illustrates an example flow chart for how different types of data from multimedia content included in a multimedia file—for example, visual and/or audio data—can be analyzed for certain scene feature(s).

As shown in more detail in FIG. 2B, different types of data from multimedia content of multimedia file 100 or from metadata included in multimedia file 100 are analyzed by the Feature Extraction Model(s) 210 to determine the feature(s) 220 associated with each scene 120. For example, visual data 250 from multimedia content multimedia file 100 may be analyzed by Feature Extraction Model(s) 210, such as an OCR Model or a Black Frame Detector model, to determine extracted scene feature(s) 220. An OCR model may be applied to text identified in the scene, in order to perform character recognition on the text. The Black Frame Detector model may be used to detect a black or blank frame within a predetermined proximity to the scene (e.g., before or after a particular scene).

The extracted scene feature(s) 220 taken from visual data 250 may include, for example: the number of known words (detecting words commonly used in opening credits, such as "introducing," "producer," or "produced by," etc.); people names (because opening credits usually list the names of the actors, producers, etc.); and/or the existence of a black frame within a predetermined proximity of that scene. The extracted scene feature(s) 220 taken from visual data 250 may also include font characteristics of text that appears on the screen, including font size. The extracted scene feature(s) 220 taken from visual data 250 may also include known media assets-such as, for example, known TV show or movie names.

As shown in FIG. 2B, audio data 260 may also be analyzed by Feature Extraction Model(s) 210, such as a speech-to-text model, a music detector model, and/or a silence detector model. The Feature Extraction Model(s) 210 may identify a language spoken in the scene and employ a speech-to-text function for the recognition and translation of a spoken language into text. The Feature Extraction Model(s) 210 may detect any music that plays during a scene and recognize the duration of time that the music plays during the scene. The feature extraction may also detect a particular volume associated with the music, or a volume change from one scene to the next, or volume contrast from music relative to spoken words. For example, in some instances, background music is typically at a lower volume while characters are speaking, while an opening song is usually at a higher volume than the background music. The Feature Extraction Model(s) 210 may detect silence of a predetermined duration that occurs either within a scene or within a predetermined time after a scene ends.

Additionally, the extracted scene feature(s) 220 taken from audio data 260 may include, for example: the rate of words spoken during a scene, the number of speakers participating in the scene, the amount of time that music plays in the scene, and/or the presence of silence that occurs near the end of a scene or just after the scene. The Feature Extraction Model(s) 210 used to analyze audio data 260 may involve diarization model(s).

As shown in FIG. 2B, the audio and visual data together 270 may be analyzed by Feature Extraction Model(s) 210, such as a scenes creation model, to determine extracted scene feature(s) 220—including, for example, the duration of the scene, the number of shots comprising the scene, and the scene location within multimedia file 100. An opening song is typically at or near the beginning of a multimedia file.

Figure 3:
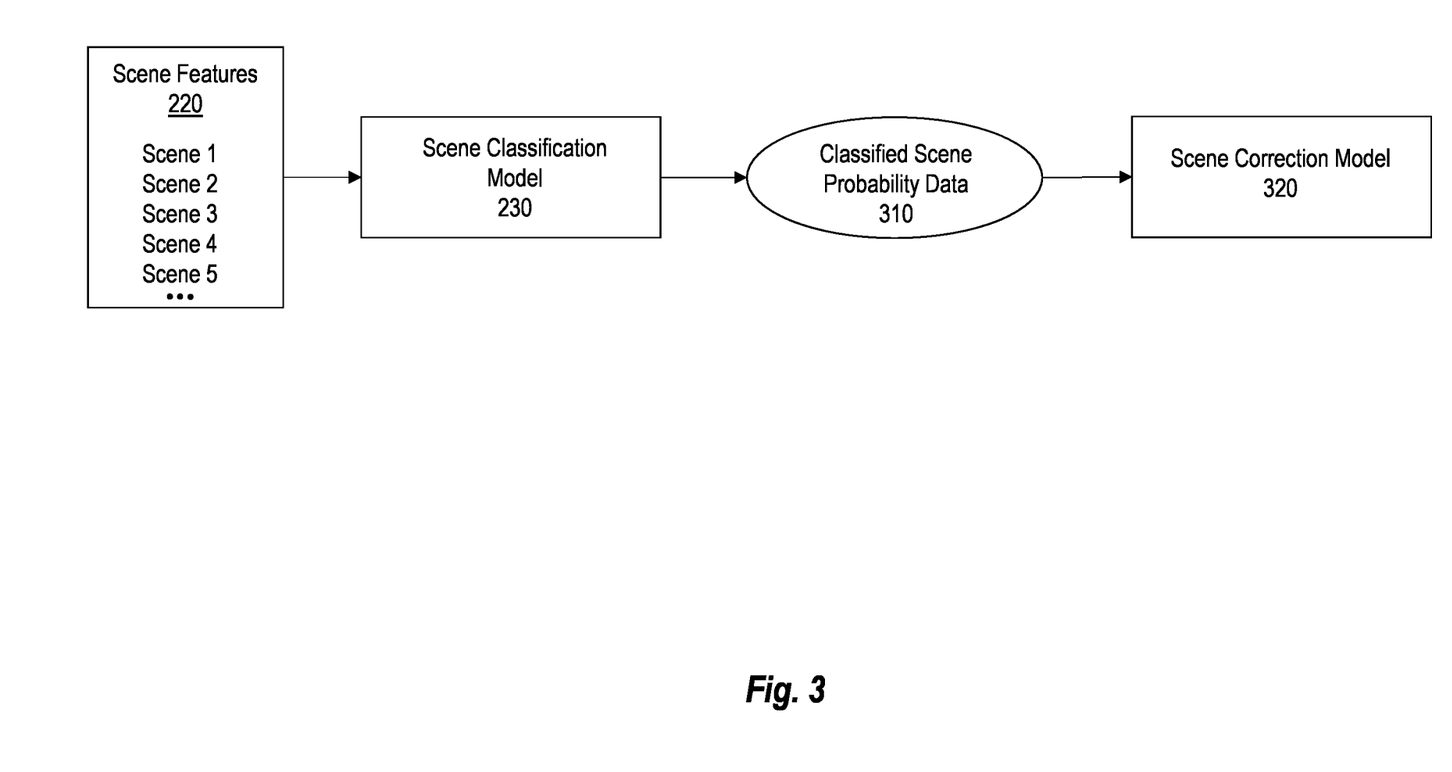
FIG. 3 illustrates an example flow chart for how scene feature(s) can be analyzed using a scene classification model to determine a probability that each scene is part of a predefined introduction/opening song, and to classify each scene as either part of, or not part of, the introduction/opening song.

Attention will now be directed to FIG. 3. Once the multimedia file 100 has been broken into scene(s) 120 (as shown in FIG. 1), and feature(s) 220 have been extracted from each scene 120 (as shown in FIGS. 2A and 2B), the results of the features analyses may be aggregated and used to classify each scene 120 with a probability that the scene is a part of the opening song 130 (as shown in FIG. 3). For example, as shown in FIG. 3, the extracted scene feature(s) 220 data may be analyzed using Scene Classification Model 230 to determine classified scene probability data 310, wherein each scene 120 has been assigned a probability 410 (shown in FIG. 4) that the scene 120 is part of the opening song 130. Using the classified scene probability data 310, the opening song 130 may be determined using, for example, algorithmic heuristics which locate a sequence of scene(s) 120 that have been assigned sufficiently high probabilities 410 of being part of the opening song 130.

Scene Classification Model 230 may be trained using a Scene Correction Model 320, which determines the success of each scene feature 220 in predicting the probability that scene 120 is part of the opening song 130. The result would be that in subsequent applications of Scene Classification Model 230, certain feature(s) 220 may be given more classification weight and other feature(s) 220 may be given less classification weight when determining the probability that a scene from scene(s) 120 is part of the opening song 130, based on the past success (or failure) of those feature(s) 220 to correctly predict that the scene was part of the opening song 130. For example, different text (either from the audio or visual data) associated with a scene may be given different classification weights by the Scene Classification Model 230.

Figure 4:
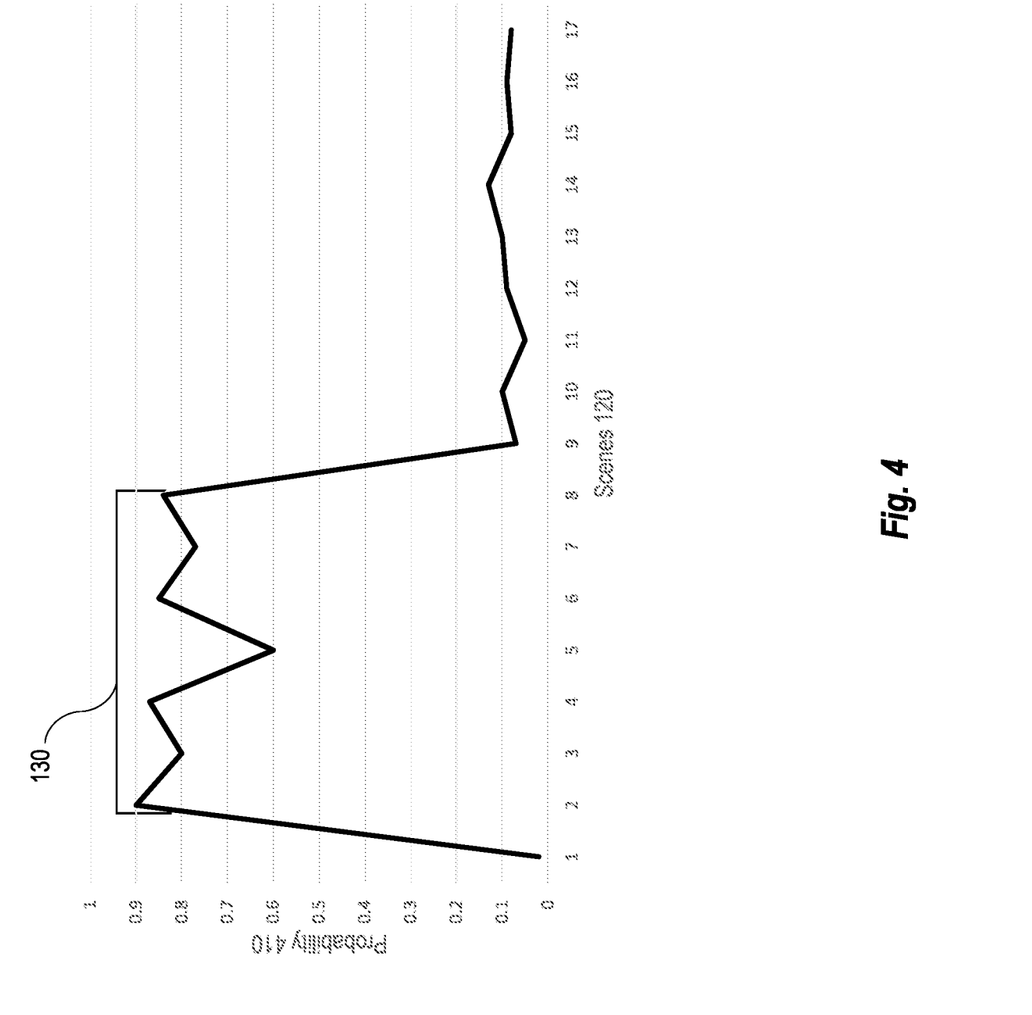
FIG. 4 illustrates an example graph showing how a probability assigned to each scene in a multimedia file may be used to determine which scene, or series of scenes, constitutes a predefined introduction/opening song.

As shown in FIG. 4, classified scene probability data 310 provides the probabilities 410 that each scene 120 is a part of the opening song 130 and can be analyzed to find the sequence of scene(s) 120 with sufficiently high probability 410 so as to constitute the opening song 130. While analyzing the classified scene probability data 310, knowledge of adjacent scenes 120 may be combined to detect the full opening song 130. For example, as shown in FIG. 4, scenes 2-4 and 6-8 have been assigned a fairly high probability 410 of being part of the opening song, while scene 5 has been assigned a lower probability 410 of being part of the opening song. However, if knowledge of adjacent scenes is combined, scene 5 will be designated as part of the opening song, along with scenes 2-4 and 6-8, because of the high probability 410 of its neighboring scenes.

It should be appreciated that the machine learning model is tunable in determining how many more scenes should be analyzed after a scene is predicted to have a low probability score before refraining from analyzing the rest of the file. In other instances, all of the scenes are analyzed. The scenes which correspond to the opening song can then be tagged. These tags can be used in post-editing to insert "intro skip" functions for a user to skip over the opening song while streaming the media file. Additionally, it should be appreciated that in some instances, the system analyzes a relative relationship between probability scores. For example, if a low probability score is followed by a high probability score with a score difference that meets or exceeds a pre-determined threshold, the scene with the high probability score is likely the beginning of the opening song. If a high probability score is followed by a low probability score with a score difference that meets or exceeds a pre-determined threshold, the system may predict that the scene with the high probability score is the end of the opening song.

In some instances, the system may determine that there is no opening song included in the media file, for example, if there is not a big enough difference between the probability scores of different scenes, or if the probability scores of the scenes do not meet or exceed a pre-determined threshold value. The threshold value can be pre-determined by a user or learned and set automatically by the computing system. In some instances, a different threshold value is chosen for different types or categories of media files or can be dynamically updated based on identifying the type of media file or based on certain features which have been extracted for one or more scenes.

Figure 5:
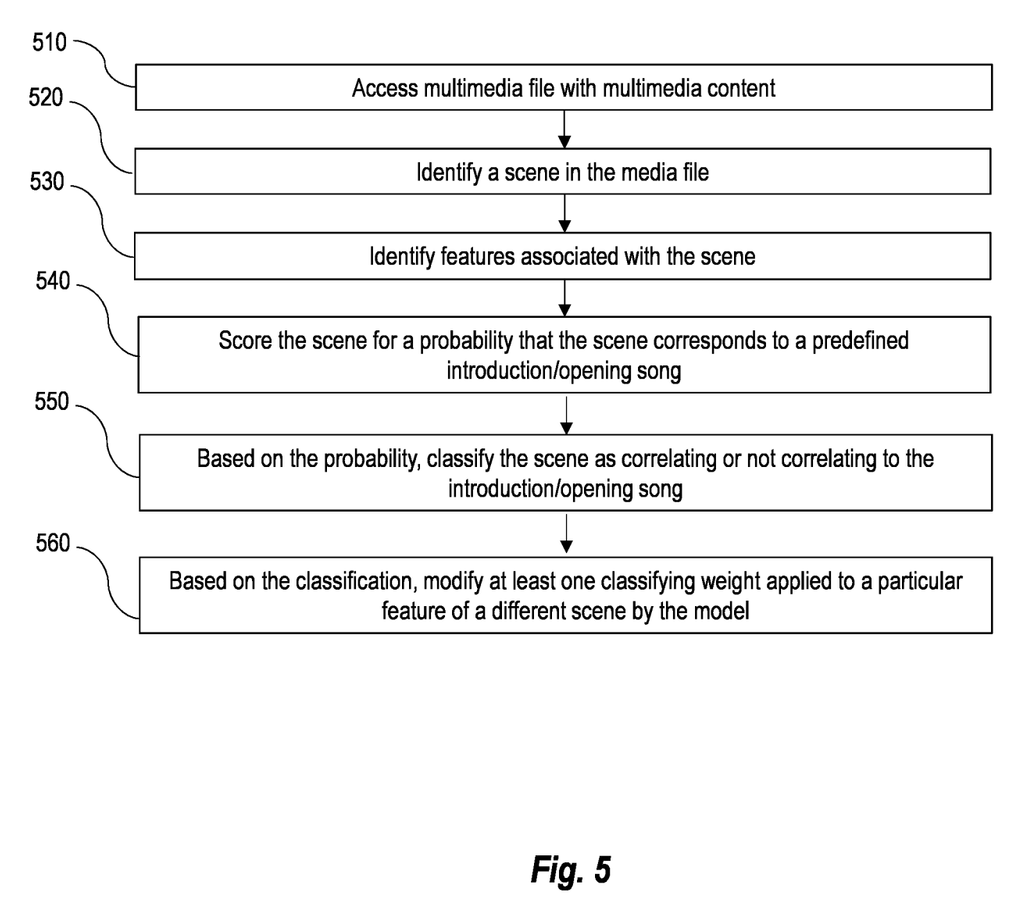
FIG. 5 illustrates an example flow chart for automatically detecting a predefined introduction/opening song in a multimedia file.
Figure 6:
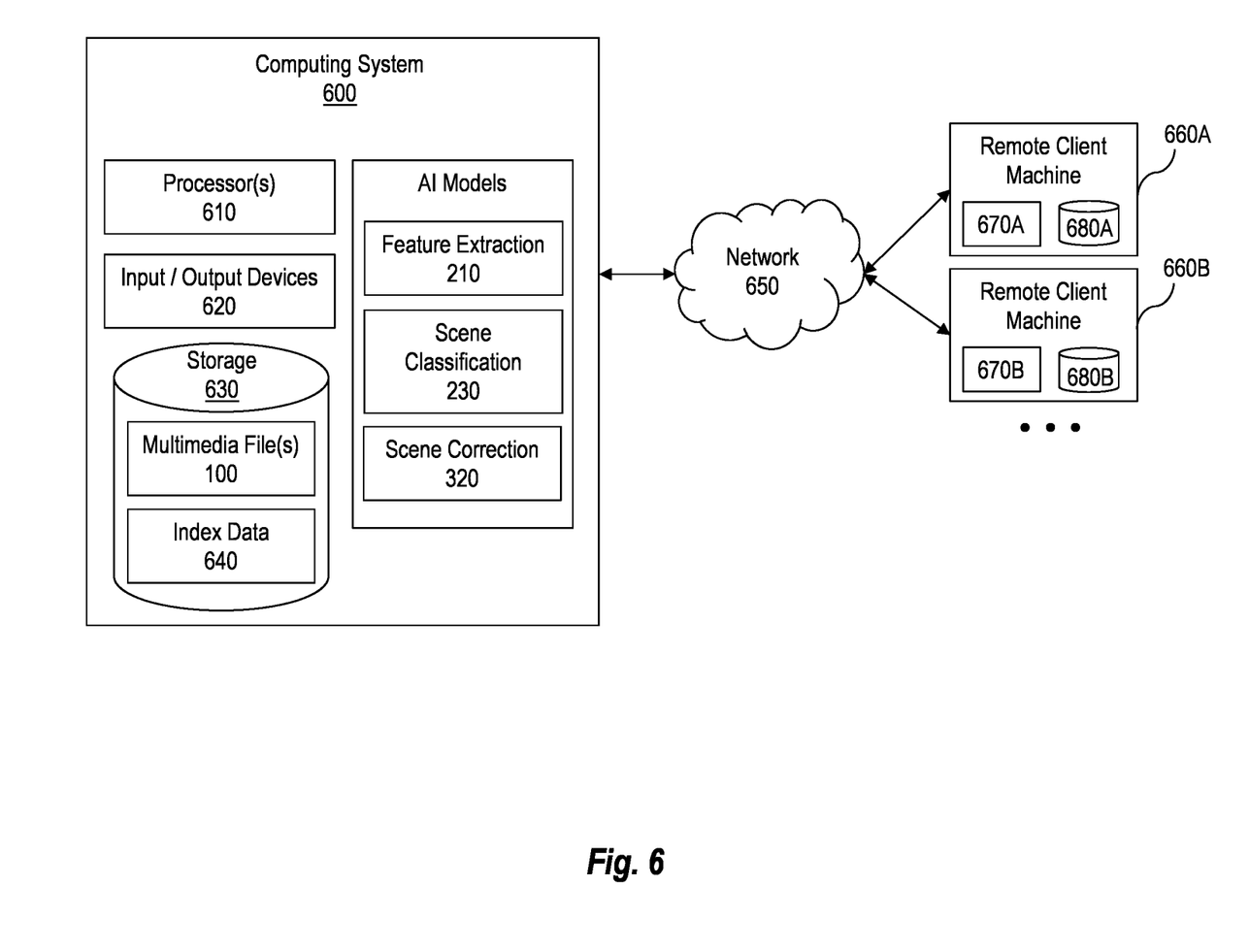
FIG. 6 illustrates an example computing environment in which a computing system incorporates and/or is utilized to perform disclosed aspects of the disclosed embodiments.

Attention will now be directed to FIG. 5, which illustrates a flow diagram that includes various acts (act 510, act 520, act 530, act 540, act 550, and act 560) associated with example methods that can be implemented by computing system 600 for performing opening song detection using a machine learning model.

For example, the disclosed methods for automatically detecting an opening song 130 in a multimedia file 100 may include, for example, the initial act of accessing a multimedia file 100, which contains multimedia content (act 510). The multimedia file 100 may then be analyzed (as described above with regards to FIG. 1) to identify a scene (e.g., scene(s) 120) in the multimedia file 100 (act 520). Then, feature(s) 220 of the multimedia content included in the multimedia file may be determined relative to their association with each scene 120 (act 530), as described above in regard to FIGS. 2A and 2B.

Each scene 120 may then be scored with a probability 410 that the scene corresponds to a predefined opening song 130 (act 540), as described above regarding FIGS. 3-4. Based on the probability 410, the scene will then be classified as correlating, or not correlating, to the opening song 130 (act 550).

In determining the probability that a different scene 120b is part of the opening song 130, the classifying weight of at least one feature 220 may be modified by Scene Correction Model 320 when determining a probability 310 that the new scene 120b is part of the opening song 130, based on the success of the machine learning model in accurately predicting whether the first scene 120 was part of the opening song 130 (act 560).

Once the opening song 130 has been identified, the temporal location of the opening song 130 can be stored as index data that is associated with the multimedia file 100. The index data may be associated with the multimedia file 100 by adding the index data as new metadata to the multimedia file 100, or by adding the index data to an index that is stored separately from the multimedia file 100. The index data may be associated with the multimedia file 100 in such a way as to enable a trick play function to be performed to the multimedia file 100, during which the index data is referenced for skipping or fast-forwarding the opening scene(s) of the multimedia file 100 file during the trick play function.

In some instances, the method further comprises generating index data that identifies a temporal location of the opening song in the media file and associating the index data with the media file. The system can associate the index data with the media file according to several different techniques. For example, the system performs the association by adding the index data as metadata to the media file or by adding the index data to an index that is stored separately from the media file. Additionally, or alternatively, the index data is associated with the media file in such a manner as to enable a trick play function to be performed to the media file during which the index data is referenced for skipping or fast-forwarding the opening song and corresponding scenes of the media file during the trick play function.

The system is also able to identify features in different ways. In some instances, identifying the feature includes identifying text in the scene by applying an OCR model to perform character recognition on text identified in the scene and wherein different text is associated with different classification weights. As another example, identifying the feature includes identifying a black frame within a predetermined proximity to the scene. Additionally, or alternatively, the system identifies one or more features by identifying a language spoken in the scene and by applying a speech to text model for the recognition and translation of spoken language into text and wherein different text is associated with different classification weights. The feature may be identified using a music detector to detect any music that plays during the scene and to recognize a duration of time that the music plays during the scene or using a silence detector to detect audio silence of a predetermined duration that occurs either within the scene or within a predetermined duration after the scene ends.

Some example features that are identified are obtained from visual data and include font characteristics of text (e.g., font size). Some features that are identified are obtained from visual data and include: particular words, names of people, terms associated with production titles or credit attribution, OCR data; a size of text that appears on the screen, media assets, or a black frame within a scene or within a predetermined proximity to the scene. Some example features that are identified are obtained from audio data, including: a rate in which words spoken during the scene, a quantity of unique speakers in the scene, a duration of time within the scene that music is played, or a predetermined duration of silence after the scene ends.

Some example features that are identified are obtained from both visual and audio data, including: a scene duration, a quantity of camera shots in the scene, or a location of the scene within the media file. Using any of the aforementioned features, or other features, the system is able to classify the scene as either correlating, or not correlating, to the opening song. In some instances, the system is able to classify the scene based at least in part on knowledge of neighboring scenes, in addition to features corresponding to the scene being classified. Additionally, the system is able to learn which features from a scene are associated with a higher probability that the scene correlates to an opening song and which features from a scene are associated with a lower probability that the scene correlates to the opening song.

After the machine learning model is trained, the system accesses a media file containing multimedia content and applies the trained machine learning model (i.e., classification model) to the media file to identify a temporal location of an opening song identified in the multimedia content of the media file. This is done by generating index data that identifies the temporal location of the opening song in the multimedia content based on the identified temporal location; and associating the index data with the media file.

FIG. 6 illustrates components of a computing system 600 which may include and/or be used to implement aspects of the disclosed methods. As shown, the computing system 600 comprises a plurality of AI models—for example, a Feature Extraction Model 210, a Scene Classification Model 230, and a Scene Correction Model 320.

Computing system 600 is able to utilize different AI models, and/or different types of AI models. For example, Scene Classification Model 230 is configured as a machine learning model, such as a classification model. A machine learning model is a particular type of AI model which is configured to recognize and learn from patterns identified in datasets and utilize that learning to improve itself for a particular task for which the machine learning model is trained. A classification model is a type of machine learning model trained to perform one or more different classification tasks. Classification tasks are a type of predictive modeling problem in which the machine learning model is trained to predict a class label for a particular set or subset (e.g., a scene) of input data (e.g., multimedia content of a multimedia file). FIG. 6 illustrates how the computing system 600 is one part of a distributed computing environment that also includes remote (e.g., third party) system(s) 660 in communication (via a network 650) with the computing system 600.

As described herein, the computing system 600 is configured to train a plurality of AI models for automatically detecting scene feature(s) and probabilities that scene(s) are part of a predefined opening song. The computing system 600 is also configured to generate training data configured for training the AI models.

The computing system 600, for example, includes a processing system including one or more processor(s) 610 (such as one or more hardware processor(s)) and a storage (e.g., hardware storage device(s) 630) storing computer-executable instructions wherein one or more of the hardware storage device(s) 630 is able to house any number of data types and any number of computer-executable instructions by which the computing system 600 is configured to implement one or more aspects of the disclosed embodiments when the computer-executable instructions are executed by the one or more processor(s) 610. The computing system 600 is also shown including input/output (I/O) device(s) 620.

As shown in FIG. 6, hardware storage device(s) 630 is shown as a single storage unit. However, it will be appreciated that the hardware storage device(s) 630 is configurable as a distributed storage that is distributed to several separate and sometimes remote and/or third-party system(s) 660, such as remote client system 660A and remote client system 660B. Remote client system 660A comprises at least a processor 670A and hardware storage device 680A. Remote client system 660B comprises at least a processor 670B and hardware storage device 680B. The computing system 600 can also comprise a distributed system with one or more of the components of computing system 600 being maintained/run by different discrete systems that are remote from each other and that each performs different tasks. In some instances, a plurality of distributed systems performs similar and/or shared tasks for implementing the disclosed functionality, such as in a distributed cloud environment.

The hardware storage device(s) 630 are configured to store the different data types including multimedia file(s) 100 and index data 640. Once the location of the opening song 130 has been determined, the location may be added as index data 640 associated with the multimedia file 100. The index data 640 may be associated with the multimedia file 100 by adding index data 640 as new metadata to the multimedia file 100. Or the index data 640 may be associated with the multimedia file 100 by adding the index data 640 to an index that is stored separately from the multimedia file 100.

The storage (e.g., hardware storage device(s) 630) includes computer-executable instructions for instantiating or executing one or more of the models and/or engines shown in computing system 600. The models—for example, Feature Extraction Model 210, Scene Classification AI Model 230, and Scene Correction Model 320—are configured as AI models. In some instances, the one or more models are configured as engines or processing systems (e.g., computing systems integrated within computing system 600), wherein each engine (e.g., model) comprises one or more processors (e.g., hardware processor(s) 610) and computer-executable instructions corresponding to the computing system 600.

In some instances, the computing system 600 is provided for training and/or utilizing a machine learning model (e.g., a trained classification model) that is trained to classify different portions of multimedia content included in a media file. For example, the computing system 600 identifies a particular portion (e.g., a frame, a shot, a scene, or other predefined subset of multimedia content) in a multimedia content of a media file. The computing system 600 then identifies a feature associated with the particular portion and scores the particular portion for a probability that the particular portion corresponds to a particular classification based on a classification weight of the machine learning model that is assigned to the feature. Examples of different classifications include an opening scene, an opening song, a closing scene, a closing song, a recap of a previous episode or season of a television series, an opening credit, a closing credit, or other particular classification associated with multimedia or media content of a media file.

Based at least in part on the probability that the particular portion corresponds to the particular classification, the computing system 600 classifies the particular portion as correlating to the particular classification, or alternatively, classifies the particular portion as not correlating to the particular classification. Based on the classification for the particular portion, the computing system 600 modifies the classification weight of the machine learning model to generate a trained classification model.

Subsequently, the computing system 600 is then able to apply the trained classification model to a new media file to identify a temporal location of the particular classification in the new multimedia content included in the new media file. Computing system 600 generates index data that identifies the temporal location of the particular classification in the multimedia content based on the identified temporal location and associates the index data with the new media file.

With regard to all of the foregoing, it will be appreciated that the disclosed embodiments may include or be practiced by or implemented by a computer system, such as system 600 of FIG. 6, which is configured with one or more hardware processors and computer storage that stores computer-executable instructions that, when executed by one or more processors, cause various functions to be performed, such as the acts recited above.

Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), electrically erasable programmable read-only (EEPROM), compact disk read-only memory (CD-ROM) or other optical disk storage (such as DVDs, etc.), magnetic disk storage or other magnetic storage devices, or any other hardware storage devices which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The disclosed systems and methods may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for training a machine learning model to classify scenes in multimedia content, the method comprising:
    identifying a scene in the multimedia content of a media file;
    identifying a feature associated with the scene;
    scoring the scene for a probability that the scene corresponds to an opening song based on a classification weight of the model that is assigned to the feature;
    based at least in part on the probability that the scene corresponds to the opening song, classifying the scene as correlating to the opening song, or alternatively, classifying the scene as not correlating to the opening song; and
    based on the classification for the scene, modifying a classification weight of the machine learning model.

2. The method of claim 1, further comprising:
    generating index data that identifies a temporal location of the opening song in the media file; and
    associating the index data with the media file.

3. The method of claim 2, wherein the associating is performed by adding the index data as metadata to the media file.

4. The method of claim 2, wherein the associating is performed by adding the index data to an index that is stored separately from the media file.

5. The method of claim 2, wherein the index data is associated with the media file in such a manner as to enable a trick play function to be performed to the media file during which the index data is referenced for skipping or fast-forwarding the opening song and corresponding scenes of the media file during the trick play function.

6. The method of claim 1, wherein the identifying the feature includes identifying text in the scene by applying an OCR model to perform character recognition on text identified in the scene and wherein different text is associated with different classification weights.

7. The method of claim 1, wherein the identifying the feature includes identifying a black frame within a predetermined proximity to the scene.

8. The method of claim 1, wherein the identifying the feature includes identifying language spoken in the scene and by applying a speech to text model for the recognition and translation of spoken language into text and wherein different text is associated with different classification weights.

9. The method of claim 1, wherein the identifying the feature includes using a music detector to detect any music that plays during the scene and to recognize a duration of time that the music plays during the scene.

10. The method of claim 1, wherein the identifying the feature includes using a silence detector to detect audio silence of a predetermined duration that occurs either within the scene or within a predetermined duration after the scene ends.

11. The method of claim 1, wherein the features that are identified are obtained from visual data and include font characteristics of text.

12. The method of claim 11, wherein the font characteristics include a font size.

13. The method of claim 1, wherein the features that are identified are obtained from visual data and include:
    (i) particular words,
    (ii) names of people,
    (iii) terms associated with production titles or credit attribution,
    (iv) OCR data;
    (v) a size of text that appears on the screen,
    (vi) media assets, or
    (vii) a black frame within a scene or within a predetermined proximity to the scene.

14. The method of claim 1, wherein the features that are identified are obtained from audio data, including:
    (i) a rate at which words are spoken during the scene,
    (ii) a quantity of unique speakers in the scene,
    (iii) a duration of time within the scene that music is played, or
    (iv) a predetermined duration of silence after the scene ends.

15. The method of claim 1, wherein the features that are identified are obtained from both visual and audio data, including:
    (i) a scene duration,
    (ii) a quantity of camera shots in the scene, or
    (iii) a location of the scene within the media file.

16. The method of claim 1, further comprising:
    classifying the scene as either correlating, or not correlating, to the opening song based at least in part on knowledge of neighboring scenes.

17. A method implemented by a computing system for associating index data of an opening song with a media file, including:
    accessing a media file containing multimedia content;
    applying a trained classification model to the media file to identify a temporal location of a scene associated with an opening song in the multimedia content, the trained classification model identifying features of the scene and applying weights to the identified features of the scene to determine whether the scene meets a selected threshold of probability for being associated with the opening song;
    generating index data that identifies the temporal location of the opening song in the multimedia content based on the identified temporal location of the scene associated with the opening song; and
    associating the index data with the media file.

18. The method of claim 17, wherein the associating is performed by adding the index data as metadata to the media file.

19. The method of claim 17, wherein the associating is performed by adding the index data to an index that is stored separately from the media file.

20. The method of claim 17, wherein the selected threshold of probability for being associated with the opening song is one of a plurality of different thresholds of probability, wherein each threshold of the plurality of thresholds corresponds to a different type or category of media file, and wherein the selected threshold of probability that is based on a type or category corresponding to accessed media file containing the multimedia content.

21. A computing system for training and utilizing a machine learning model to classify a portion of multimedia content, the computing system comprising:
- a processor; and
- a hardware storage device storing computer-executable instructions that are executable by the processor for causing the computing system to:
  - identify a particular portion in the multimedia content of a media file;
  - identify a feature associated with the particular portion;
  - score the particular portion for a probability that the particular portion corresponds to a particular classification based on a classification weight of the machine learning model that is assigned to the feature;
  - based at least in part on the probability that the particular portion corresponds to the particular classification, classify the particular portion as correlating to the particular classification, or alternatively, classify the particular portion as not correlating to the particular classification;
  - based on the classification for the particular portion, modify the classification weight of the machine learning model to generate a trained classification model;
  - apply the trained classification model to a new media file to identify a temporal location of the particular classification in the new multimedia content included in the new media file;
  - generate index data that identifies the temporal location of the particular classification in the multimedia content based on the identified temporal location; and
  - associate the index data with the new media file.

* * * * *